United States Patent
Xiu et al.

(10) Patent No.: US 9,577,520 B2
(45) Date of Patent: Feb. 21, 2017

(54) POWER CONVERTER WITH BOOTSTRAP CIRCUIT

(71) Applicant: Chengdu Monolithic Power Systems Co., Ltd., Chengdu (CN)

(72) Inventors: Liping Xiu, Chengdu (CN); Yike Li, Chengdu (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/838,251

(22) Filed: Aug. 27, 2015

(65) Prior Publication Data
US 2016/0065072 A1 Mar. 3, 2016

(30) Foreign Application Priority Data
Aug. 27, 2014 (CN) .......................... 2014 1 0429063

(51) Int. Cl.
| | | |
|---|---|---|
| H02M 3/156 | (2006.01) | |
| H02M 1/08 | (2006.01) | |
| H02M 3/158 | (2006.01) | |
| H02M 1/00 | (2006.01) | |

(52) U.S. Cl.
CPC .............. *H02M 3/156* (2013.01); *H02M 1/08* (2013.01); *H02M 3/1588* (2013.01); *H02M 2001/0006* (2013.01); *H02M 2001/0045* (2013.01)

(58) Field of Classification Search
CPC ...... H02M 3/155; H02M 3/156; H02M 3/158; H02M 3/157; H02M 3/1588; H02M 1/08; H02M 2001/0003; H02M 2001/0006; H02M 2001/0045
See application file for complete search history.

(56) References Cited

U.S. PATENT DOCUMENTS

| | | | | |
|---|---|---|---|---|
| 6,201,717 | B1* | 3/2001 | Grant | H02M 3/07 363/131 |
| 8,558,586 | B1* | 10/2013 | Martin | G11C 7/1057 327/108 |
| 8,970,185 | B1* | 3/2015 | Sutardja | H02M 3/1588 323/266 |
| 2012/0091976 | A1* | 4/2012 | Chen | H03K 17/302 323/271 |
| 2014/0062449 | A1* | 3/2014 | Qu | G05F 3/02 323/311 |
| 2014/0217959 | A1* | 8/2014 | Chen | H02J 7/0052 320/107 |
| 2014/0253079 | A1 | 9/2014 | Ding et al. | |
| 2015/0061611 | A1 | 3/2015 | Li | |
| 2015/0280556 | A1* | 10/2015 | Bari | H02M 3/156 323/282 |

* cited by examiner

*Primary Examiner* — Timothy J Dole
*Assistant Examiner* — Shahzeb K Ahmad (57) ABSTRACT

A power converter with bootstrap circuit, the power converter has a high side switch, a low side switch, a bootstrap circuit and a bootstrap capacitor for providing a bootstrap voltage to supply a high side driver of the high side switch. The power converter receives an input voltage and provides an output voltage based on driving the high side switch and the low side switch to switch on and off. The bootstrap circuit has a first comparing circuit, a first comparing circuit, a boost circuit and a second charging circuit. The second charging circuit charges the bootstrap capacitor when a voltage difference between the input voltage and the output voltage is smaller than a voltage threshold.

20 Claims, 4 Drawing Sheets

POWER CONVERTER WITH BOOTSTRAP CIRCUIT

CROSS-REFERENCE TO RELATED APPLICATIONS

This application claims priority to and the benefit of Chinese Patent Application No. 201410429063.9, filed on Aug. 27, 2014, which is incorporated herein by reference in its entirety.

TECHNICAL FIELD

This disclosure relates generally to power converters, and more particularly but not exclusively relates to switching power converters with bootstrap circuit.

BACKGROUND

Figure 1:
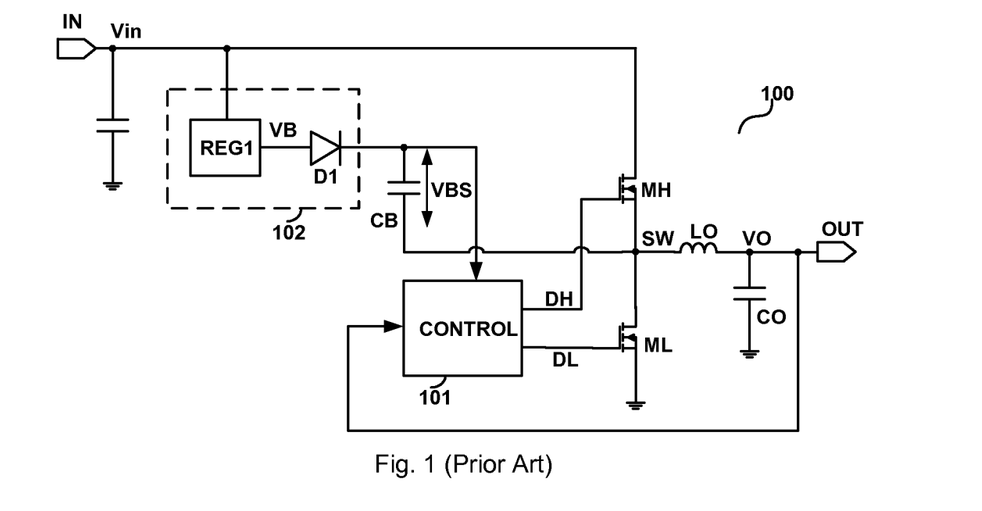
FIG. 1 illustrates a block diagram of a typical buck type DC-DC voltage converter 100.

Power converters such as switch-mode voltage regulators are widely used in various electronic devices for sourcing power to the electronic devices from a power source. Taking a buck type switching regulator for example, the buck switching regulator generally has relatively high conversion efficiency, wide bandwidth and good loop stability with sample loop compensation, and is thus popular in converting high input voltage to relatively low output voltage applications. FIG. 1 illustrates schematically a typical buck type DC-DC voltage converter 100. In brief, the voltage converter 100 is configured to receive an input voltage Vin at its input terminal IN, and convert the input voltage Vin into an appropriate output voltage Vo through controlling a high side switch MH and a low side switch ML to switch on and off in a complementary manner. The voltage converter 100 comprises a control circuit 101 for providing control signals to the high side switch MH and the low side switch ML. The high side switch MH and the low side switch ML are connected in series between the input terminal IN and reference ground GND, the common connection SW (also referred to as switching voltage output node SW) is coupled to an output terminal OUT of the voltage converter 100 via an inductive energy storage component LO. A capacitive energy storage component CO is coupled between the output terminal OUT and the reference ground GND to smooth the output voltage VO.

The high side switch MH may comprise an N-channel power switching device, such as an N-channel FET or an N-channel DMOS etc. to save chip area, reduce the size and improve the performance of the voltage converter 100. In this situation, in order to make the high side switch MH to be fully turned on (i.e. to make the high side switch MH to operate in saturation region in which the switch MH has a quite small on resistance), a voltage applied between a control terminal and a terminal connected to the node SW of the high side switch MH must be large enough, at least larger than a turn on threshold voltage of the high switch MH. For instance, in the example where the high side switch is a FET/DMOS, the voltage between a gate terminal and a source terminal (connected to the node SW) of the FET/DMOS must be larger than a turn on threshold of the FET/DMOS. However, when the high side switch MH is on, the voltage at the node SW can reach the input voltage Vin, and thus a voltage higher than the input voltage Vin must be provided to the control terminal of the high side switch MH so as to turn it on completely.

Therefore, in order to generate a voltage higher than the input voltage Vin, the voltage converter 100 generally further comprises a bootstrap circuit 102. The bootstrap circuit 102 is configured to provide a bootstrap voltage VBS referenced to the voltage at the node SW. The bootstrap voltage VBS can be used to enhance the driving capability of the control signal DH provided to the control terminal of the high side switch MH, so that the control signal DH can drive the high side switch MH to turn on and off in good condition. In the example of FIG. 1, the bootstrap circuit 102 and a bootstrap capacitor CB are connected in series between the input voltage Vin and the switching voltage output node SW, the bootstrap circuit 102 comprises a first reference REG1 and a diode DB, wherein a cathode of the diode DB is connected to the bootstrap supply terminal VB, an anode of the diode DB is connected to a first terminal of the bootstrap capacitor CB, and a second terminal of the bootstrap capacitor CB is connected to the node SW. A voltage across the capacitor CB is provided as the bootstrap voltage VBS. The operating principles of the bootstrap circuit 102 can be easily understood by the ordinary artisan. When the high side switch MH is turned off and the low side switch ML is turned on, the bootstrap capacitor CB is charged by the bootstrap supply voltage till the voltage across the bootstrap capacitor CB reaches the bootstrap voltage VBS. When the high side switch MH is turned on and the low side switch ML is turned off, the input voltage Vin of the voltage converter 100 is transmitted to the switching voltage output node SW, i.e. the voltage at the second terminal of the bootstrap capacitor CB is pulled up to the input voltage Vin. Thus, the voltage at the first terminal of the bootstrap capacitor CB is raised to a voltage higher than the input voltage Vin, substantially equals to the input voltage Vin superposing the bootstrap voltage VBS. As the voltage at the first terminal of the bootstrap capacitor CB reaches to the input voltage Vin plus the bootstrap voltage VBS, the diode DB is reversely biased and is thus turned off so as to protect the bootstrap supply voltage source from being damaged by the relatively higher input voltage Vin.

In view of the above, it can be understood that the bootstrap capacitor CB can not be charged/recharged to refresh the bootstrap voltage VBS unless the low side switch ML is turned on. However, in certain circumstances, the bootstrap capacitor CB may not have enough charge stored and may not be charged/recharged in time, resulting in the bootstrap voltage VBS to be decreased, which may cause the control signal DH to not be able to drive the high side switch MH to turn on and off properly. In such a situation, the voltage converter 100 will no longer be able to operate normally, which is not desired. For example, when the voltage converter 100 operates in light load or no load condition, the control circuit 101 is configured to reduce the on time and/or the switching frequency of the high side switch MH and the low side switch ML to improve the conversion efficiency of the converter 100. However, this may lead to the capacitor CB not being able to be charged/recharged in time because the on time of the low side switch ML is too short or the high side switch MH and the low side switch ML do not switch in a relatively long time. In other circumstance, for example, if the desired value of the output voltage Vo is close to the input voltage Vin, the high side switch MH has to operate in quite high duty cycle or 100% duty cycle, wherein the duty cycle refers to a percentage of the on time of the high side switch MH in the switching cycle of the switches MH and ML. In this case, the on time of the low side switch ML in one switching cycle may be quite short or the low side switch ML may even have no chance to turn on, resulting that the bootstrap capacitor CB can not be charged/recharged in time to store enough electrical charges to provide a high enough bootstrap voltage VBS. The bootstrap capacitor CB should wait till the output voltage Vo drops, which implies that the duty cycle decreases and the on time of the low side switch ML increases, in order to be charged/recharged so as to refresh the bootstrap voltage VBS (i.e. to make the bootstrap voltage VBS restore to a high enough value). However, this event can result in large spikes in the output voltage Vo. For example, supposing the converter 100 has a 6V input voltage Vin and a 3.3V desired output voltage Vo, a 3V bootstrap voltage VBS is required to ensure the high side switch MH to be turned on and off normally. In this example, if an output current drawn from the converter 100 by a load is relatively small or no output current is drawn (i.e. the converter 100 operates in light load or no load condition), the bootstrap voltage VBS will decrease to smaller than 2.7V, inducing the high side switch MH not being able to turn on normally. The bootstrap capacitor CB should wait until the output voltage VO decreases to smaller than 3V in order to be recharged so that the bootstrap voltage VBS can refresh/restore to 3V. Then, the high side switch MH and the low side switch ML can switch normally to regulate the output voltage Vo to resume to its desired value 3.3V. However, each time the output voltage Vo resumes from smaller than 3V to 3.3V, a large spike occurs, which is harmful to the converter 100 and the load, and thus is undesirable.

A need therefore exists for solving the problem of charging the bootstrap capacitor CB in power converters.

SUMMARY

In accomplishing the above and other objects, there has been provided, in accordance with an embodiment of the present disclosure, a bootstrap circuit for a power converter, wherein the power converter comprises a high side switch, a low side switch and a bootstrap capacitor for providing a bootstrap voltage to supply a high side driver of the high side switch, and wherein the bootstrap capacitor has a first terminal and a second terminal, and wherein the power converter is configured to receive an input voltage and to provide an output voltage by means of turning the high side switch and the low side switch on and off, the bootstrap circuit comprising: a first charging circuit having an input terminal and an output terminal, wherein the input terminal is configured to receive the input voltage, and wherein the output terminal is coupled to the first terminal of the bootstrap capacitor; a first comparing circuit having a first input terminal, a second input terminal and an output terminal, wherein the first input terminal is configured to receive the input voltage, and wherein the second input terminal is configured to receive the output voltage, and further wherein based on a first threshold voltage and a voltage difference between the input voltage and the output voltage, the first comparing circuit is configured to provide a comparing signal at the output terminal; a boost circuit having an input terminal and an output terminal, wherein the input terminal is configured to receive the input voltage or the output voltage, and wherein the output terminal is configured to provide a first high voltage; and a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference between the input voltage and the output voltage is smaller than the voltage threshold.

There has also been provided, in accordance with an embodiment of the present disclosure, a power converter, comprising: a channel switch coupled between an input terminal of the power converter and an output terminal of the power converter, wherein the output terminal of the power converter is configured to provide a output voltage; an output capacitor couple between the output terminal of the power converter and ground; an inductor coupled between the output terminal of the power converter and a switching terminal; a high side switch coupled between the switching terminal and a storage terminal, wherein the storage terminal of the power converter is configured to provide a storage voltage; a storage capacitor coupled between the storage terminal and ground; a low side switch coupled between the switching terminal and ground; a bootstrap capacitor having a first terminal and a second terminal, wherein the second terminal is coupled to the switching terminal, configured to provide a bootstrap voltage; a first charging circuit having an input terminal and an output terminal, wherein the input terminal is configured to receive the storage voltage, and wherein the output terminal is coupled to the first terminal of the bootstrap capacitor; a first comparing circuit having a first input terminal, a second input terminal and a first output terminal, wherein the first input terminal is configured to receive the storage voltage, and wherein the second input terminal is configured to receive the output voltage, and further wherein based on a first threshold voltage and a voltage difference between the storage voltage and the output voltage, the first comparing circuit is configured to provide a comparing signal at the first output terminal; a boost circuit having an input terminal and an output terminal, wherein the input terminal is configured to receive the storage voltage or the output voltage, and wherein the output terminal is configured to provide a first high voltage; and a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference between the storage voltage and the output voltage is smaller than the voltage threshold.

There has also been provided, in accordance with an embodiment of the present disclosure, A bootstrap circuit for a power converter, wherein the power converter comprises a high side switch, a low side switch and a bootstrap capacitor for providing a bootstrap voltage to supply a high side driver of the high side switch, and wherein the bootstrap capacitor has a first terminal and a second terminal, and wherein the power converter is configured to receive an input voltage and to provide an output voltage by means of turning the high side switch and the low side switch on and off, the bootstrap circuit comprising: a first charging circuit having an input terminal and an output terminal, wherein the input terminal is configured to receive the input voltage, and wherein the output terminal is coupled to the first terminal of the bootstrap capacitor; a first comparing circuit having a first input terminal, a second input terminal and an output terminal, wherein the first input terminal is coupled to the first terminal of the bootstrap capacitor, and wherein the second input terminal is coupled to the second terminal of the bootstrap capacitor, and further wherein based on a first threshold voltage and a voltage difference across the bootstrap capacitor, the first comparing circuit is configured to provide a comparing signal at the output terminal; a boost circuit having an input terminal and an output terminal, wherein the input terminal is configured to receive the input voltage or the output voltage, and wherein the output terminal is configured to provide a first high voltage; and a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference across the bootstrap capacitor is smaller than the voltage threshold.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 2:
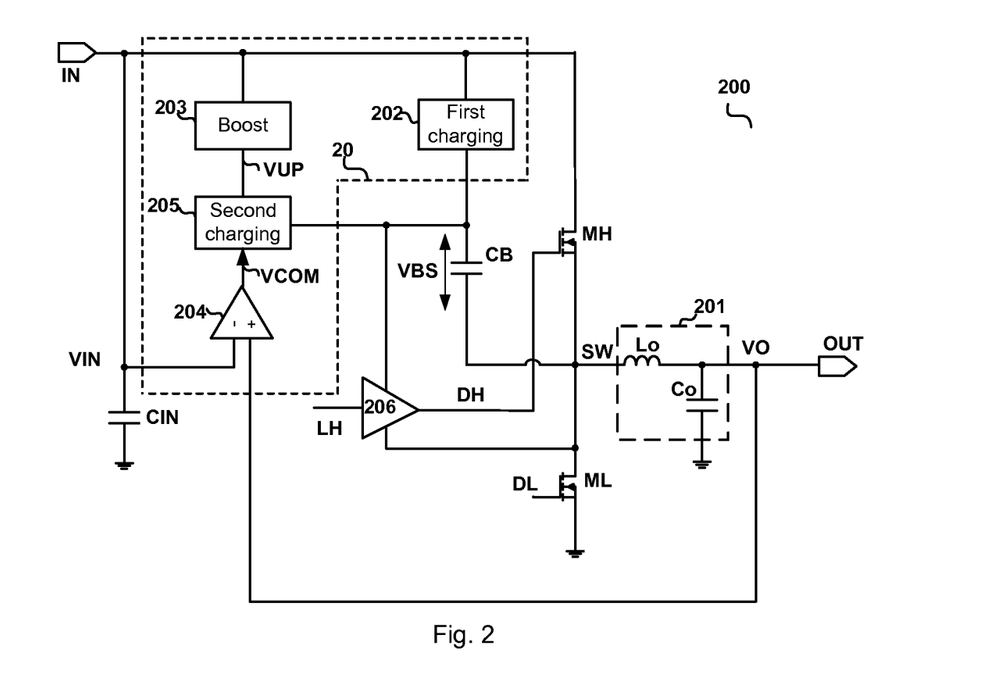
FIG. 2 illustrates a schematic diagram of a power converter 200 in accordance with an exemplary embodiment of the present invention.
Figure 3:
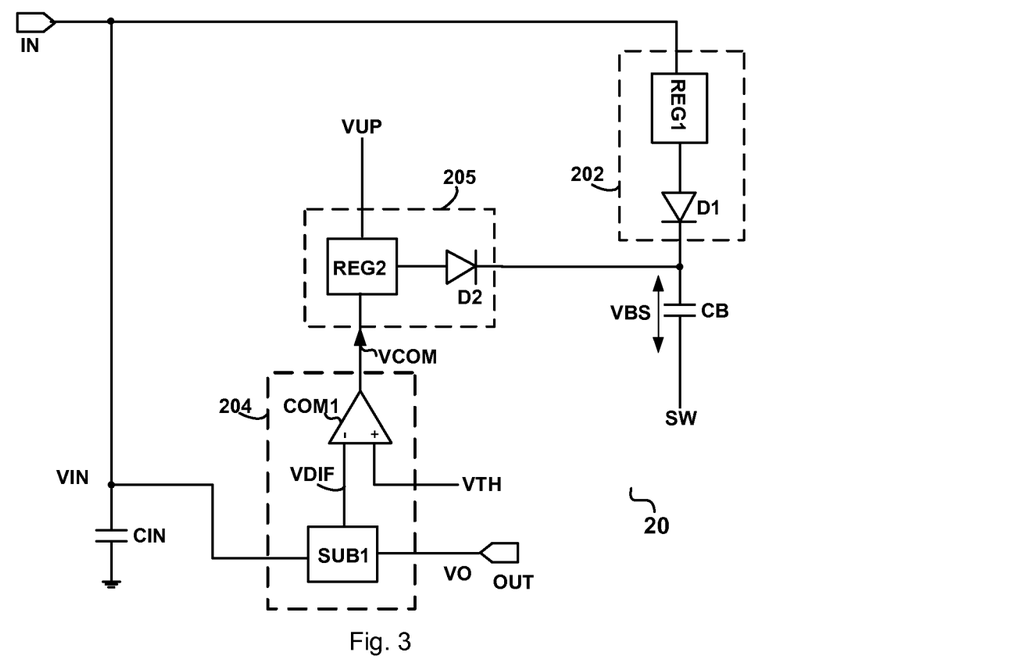
FIG. 3 illustrates a schematic diagram of a bootstrap circuit 20 in accordance with an alternative exemplary embodiment of the present invention.

FIG. 2 illustrates a schematic diagram of a power converter 200 in accordance with an exemplary embodiment of the present invention. The power converter 200 may comprise an input terminal IN configured to receive an input voltage Vin; an output terminal OUT configured to provide an output voltage VO and an output current IO for supplying a load. The power converter 100 further comprises a switch circuit illustrated as to comprise a high side switch MH and a low side switch ML coupled in series between the input terminal IN and a reference ground GND, wherein the high side switch MH and the low side switch ML has a common connection SW referred to in the following as a switching terminal SW, providing a switching voltage VSW. The power converter 100 further comprises an output filter 201 coupled between the switching terminal SW and the output terminal OUT to convert the switching voltage VSW into the smoothed output voltage VO. The power converter 100 further comprises a bootstrap capacitor CB, a high side driver 206 and a bootstrap circuit 20. The bootstrap capacitor CB has a first terminal and a second terminal, the second terminal of the bootstrap capacitor CB is coupled to the switching terminal SW. The high side driver 206 may at least comprise a bootstrap input terminal configured to receive the bootstrap voltage VBS and an output control terminal configured to provide an enhanced high side driving signal DH to the high side switch MH to drive the high side switch MH switching on and off periodically. The bootstrap circuit 20 comprises a first charging circuit 202, a boost circuit 203, a first comparing circuit 204, and a second charging circuit 205. FIG. 3 illustrates a schematic diagram of the bootstrap circuit 20 in accordance with an exemplary embodiment of the present invention.

The first charging circuit 202 has an input terminal and an output terminal, wherein the input terminal is configured to receive the input voltage Vin, and wherein the output terminal is coupled to the first terminal of the bootstrap capacitor CB. In one embodiment, as shown in FIG. 3, the first charging circuit 202 comprises a first reference source REG1 and a first diode D1. The first reference source REG1 is configured to charge the bootstrap capacitor CB when the low side switch ML is turned on. The first diode D1 is configured to prevent the bootstrap capacitor CB from reversely charging the first reference source REG1 when the high side switch MH is turned on. The first reference source REG1 could be a current source or a voltage source. In an embodiment, the first reference source REG1 provides a 5V voltage.

The boost circuit 203 has an input terminal and an output terminal, wherein the input terminal is configured to receive the input voltage Vin or the output voltage Vo, and wherein the output terminal is configured to provide a first high voltage VUP, for example, 2Vin. In one embodiment, the boost circuit 203 comprises an integrated 2× charge pump. In another embodiment, the boost circuit 203 comprises an integrated 3× charge pump, so as to obtain a higher voltage.

The first comparing circuit 204 has a first input terminal, a second input terminal and a first output terminal, the first input terminal is configured to receive the input voltage Vin, the second input terminal is configured to receive the output voltage VO, based on a threshold voltage VTH and a voltage difference VIO between the input voltage Vin and the output voltage Vo, the first comparing circuit is configured to provide a comparing signal VCOM at the first output terminal. In one embodiment, as shown in FIG. 3, the first comparing circuit 204 comprises a subtractor SUB1 and a first comparator COM1. The subtractor SUB1 has a first input terminal, a second input terminal and an output terminal, wherein the first input terminal is configured to receive the input voltage Vin, and wherein the second input terminal is configured to receive the output voltage VO, based on the voltage difference between the input voltage Vin and the output voltage VO, the subtractor is configured to provide a difference signal VDIF at the output terminal. The first comparator COM1 has a first input terminal, a second input terminal and an output terminal, wherein the first input terminal is configured to receive the difference signal VDIF, and wherein the second input terminal is configured to receive the threshold voltage VTH, and wherein the subtractor is configured to provide the comparing signal VCOM at the output terminal. In an embodiment, the comparing signal VCOM has a first logic state when the voltage difference between the input voltage Vin and the output voltage Vo is smaller than the threshold voltage VTH, and has a second logic state when the voltage difference between the input voltage Vin and the output voltage VO is greater than the threshold voltage VTH. In an embodiment, the first comparing circuit 204 could be a hysteresis comparator, for example a comparator with 0.1V hysteresis. The threshold voltage VTH could be 2V, 1V or even smaller.

The second charging circuit 205 has an input terminal, a control terminal and an output terminal, wherein the input terminal is configured to receive the first high voltage VUP, and wherein the output terminal is coupled to the first terminal of the bootstrap capacitor CB, and wherein the control terminal is configured to receive the comparing signal VCOM, and wherein the second charging circuit 205 is configured to charge the bootstrap capacitor CB in response to the comparing signal VCOM. For example, the second charging circuit 205 charges the bootstrap capacitor CB when the voltage difference between the input voltage Vin and the output voltage VO is smaller than the voltage threshold VTH.

In an embodiment, the external power supply is removed after the input capacitor CIN is charged, so the input voltage Vin is provided by the input capacitor CIN. The input voltage Vin would keep falling down since energy stored in the input capacitor CIN is continuously being transferred to the output capacitor CO. The comparing signal VCOM would change from a first logic state to a second logic state when the voltage difference between the input voltage Vin and the output voltage Vo is smaller than the threshold voltage VTH. If the comparing signal VCOM is on the first state, the first charging circuit 202 charges the bootstrap capacitor CB when the low side switch is turned on, and the second charging circuit 205 is disabled. If the comparing signal VCOM is on the second state, the second charging circuit 205 charges the bootstrap capacitor CB. In an embodiment, the second charging circuit 205 comprises a second reference source REG2 and a second diode D2 coupled in series. If the comparing signal VCOM is on the first state, the second reference source REG2 is disabled and the second diode D2 prevent the bootstrap capacitor CB from charging the second reference source REG2. If the comparing signal VCOM is on the second state, the second reference source REG2 provide a related high voltage (e.g. VO+5V) to charge the bootstrap capacitor CB. The second charging circuit 205 could charge the bootstrap capacitor CB at any time of a switching cycle. In one embodiment, to prevent the bootstrap capacitor CB from absorbing a large current from the second reference source REG2 when the low side switch is turned on, the second charging circuit 205 charges the bootstrap capacitor CB only if the high side switch MH is turned on.

In an embodiment, as the input voltage Vin keeps decreasing, the high side switch MH remains on, the first charge circuit 202 will not be able to charge the bootstrap capacitor CB, and the second charging circuit 205 continues to charge the bootstrap capacitor CB to avoid the high side switch MH being turned off caused by low VBS.

Compared with the power convert 100, power convert 200 have many advantages. In prior art, the bootstrap voltage VBS decreases with the input voltage, but for the power convert 200, the second charging circuit 200 could charge the bootstrap voltage VBS to a higher value. In an operation cycle with a large duty-cycle, the on time of the low side switch ML in one switching cycle may be quite short or the low side switch ML may even have no chance to be turned on, resulting that the bootstrap capacitor CB can not be charged/recharged in time to store enough electrical charges to generate a high enough bootstrap voltage VBS, but the second charging circuit 205 could charge the bootstrap capacitor CB even the high side switch is turned on, so as to avoid the issues caused by large duty cycle.

Figure 4:
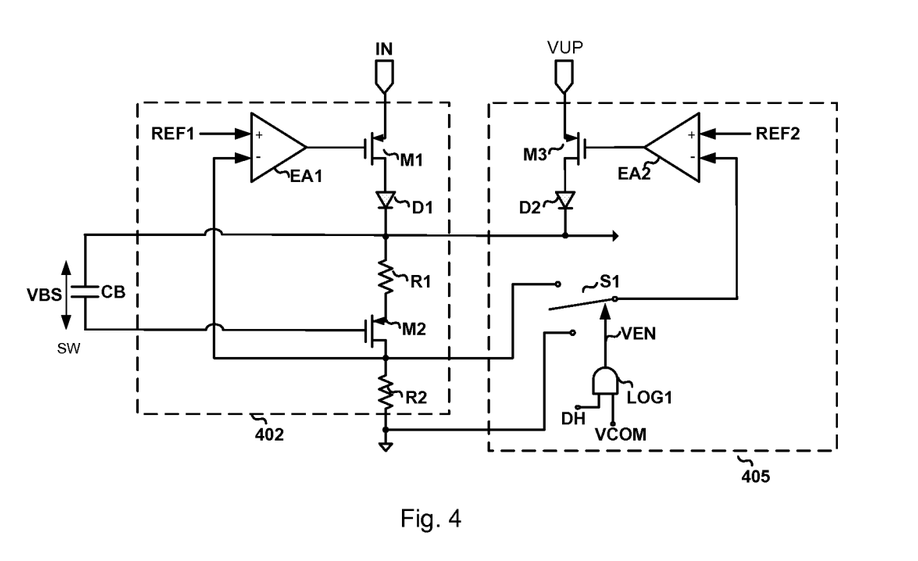
FIG. 4 illustrates a schematic diagram of a first charging circuit 402 and a second charging circuit 405 in accordance with an alternative exemplary embodiment of the present invention.

FIG. 4 illustrates a schematic diagram of a first charging circuit 402 and a second charging circuit 405 in accordance with an exemplary embodiment of the present invention. The first charging circuit 402 and the second charging circuit 405 could be directly applied in the power converter to replace the first charging circuit 202 and the second charging circuit 205.

The first charging circuit 402 comprises a first transistor M1, a first diode D1, a first resistor R1, a second transistor M2, a second resistor R2 and a first amplifier EA1. The first transistor M1 has a first terminal, a second terminal and a control terminal, wherein the first terminal serves as the first terminal of the first charging circuit 402. The first diode D1 has a cathode and an anode, wherein the anode is coupled to the second terminal of the first transistor M1, and wherein the cathode serves as the output terminal of the first charging circuit 402. The first resistor R1 has a first terminal and a second terminal, wherein the first terminal is coupled the output terminal of the first charging circuit 402. The second transistor M2 has a first terminal, a second terminal and a control terminal, wherein the first terminal is coupled to the second terminal of the first resistor R1, and wherein the control terminal is coupled to the second terminal of the bootstrap capacitor CB. The second resistor R2 has a first terminal and a second terminal, wherein the first terminal is coupled the second terminal of the second transistor R2, and wherein the second terminal is connected to ground GND. The first amplifier EA1 has a first input terminal, a second input terminal and an output terminal, wherein the first input terminal is configured to receive a first reference signal VREF1, and wherein the second input terminal is couple to the first terminal of the second resistor R2, and wherein the output terminal is coupled to the control terminal of the first transistor M1.

The second charging circuit 405 comprises a third transistor M3, a second diode D2, a first logic circuit LOG1, a second amplifier EA2 and first switch S1. The third transistor M3 has a first terminal, a second terminal and a control terminal, wherein the first terminal serves as the first terminal of the second charging circuit 405. The second diode D2 has a cathode and an anode, wherein the anode is coupled to the second terminal of the third transistor M3, and wherein the cathode serves as the output terminal of the second charging circuit 405. The first logic circuit LOG1 is configured to provide a control signal VEN according to the comparing signal VCOM. In an embodiment, the first logic circuit LOG1 provides the control signal VEN based on the comparing signal VCOM and a driving signal LH, and wherein the driving signal LH is configured to drive the high side switch MH. The second amplifier EA2 has a first input terminal, a second input terminal and an output terminal, wherein the first input terminal is configured to receive a second reference signal VREF2, and wherein the second input terminal is couple to the first terminal of the second resistor R2, and wherein the output terminal is coupled to the control terminal of the third transistor M3. The first switch having a first terminal, a second terminal, a third terminal and a control terminal, wherein the first terminal is coupled to the first terminal of the second resistor R2, and wherein the second terminal is connected to ground GND, and wherein the third terminal is coupled to the second terminal of the second amplifier EA2, and wherein the control terminal is configured to receive the control signal VEN, based on the control signal VEN, the first switch selectively connect the third terminal to either the first terminal or the second terminal of the first switch S1.

According to one embodiment of the present invention, when the high side switch MH is turned off and low side switch ML is turned on, the switch terminal SW is pulled down to GND, and the second transistor M2 is turned on. The first resistors R1, the second transistor M2, the second resistor are coupled in series to sense the voltage on the first terminal of the bootstrap capacitor CB and provide a feedback voltage to the second terminal of the first amplifier EA1. The first transistor M1 would charge the bootstrap capacitor CB. When the high side switch MH is turned on and low side switch ML is turned off, the switch terminal SW is pulled up to the input voltage Vin, and the voltage on the first terminal of the bootstrap capacitor CB is pull up to Vin+VBS. The first diode D1 prevents the input voltage Vin from being charged via the first transistor M1. The second transistor M2 is turned off to avoid a high voltage generated on the first terminal of the second resistor R2, as the high voltage on the first terminal of the second resistor R2 may damage devices such as the input transistor of the first amplifier EA1.

Figure 5:
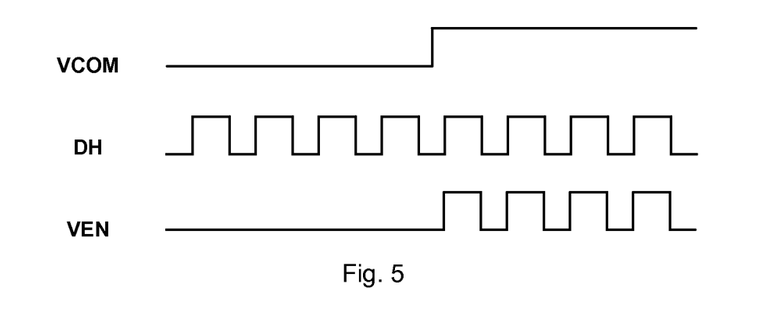
FIG. 5 illustrates an operation waveform diagram of a first logic circuit LOG1 in accordance with an exemplary embodiment of the present invention.

FIG. 5 illustrates an operation waveform diagram of a first logic circuit LOG1 in accordance with an exemplary embodiment of the present invention. If the difference between the input voltage Vin and the output voltage is greater than the threshold VTH, the comparing signal VCOM is on a first state, and the second terminal of the amplifier EA2 is pulled down to ground by the first switch S1. The second amplifier would provide a related high voltage to turn off the third switch M3, and the second charging circuit 405 does not charge the bootstrap capacitor CB. The input voltage Vin would keep falling down since energy stored in the input capacitor CIN is continuously being transferred to the output capacitor CO. The comparing signal VCOM would change from the first logic state to the second logic state when the voltage difference between the input voltage Vin and the output voltage Vo is smaller than the threshold voltage VTH. If the high side switch MH is turned off and low side switch ML is turned on, the second terminal of the amplifier EA2 is pulled down to ground by the first switch S1, and the second amplifier would provide a related high voltage to turn off the third switch M3. If the high side switch MH is turned on and low side switch ML is turned off, the second terminal of the second amplifier EA2 is coupled to the first terminal of the second resistor R2 by the first switch S1. The third transistor M3 is turned on to charge the bootstrap capacitor CB. The second transistor R2 would serve as an active resistor to limit the voltage on the second terminal of the second amplifier EA2, so as to increase the charging ability of the third transistor M3. In some embodiments, the first logic circuit LOG1 could provide various signals according to the voltage comparing signal VCOM, so as to charge the bootstrap capacitor during different time intervals.

Figure 6:
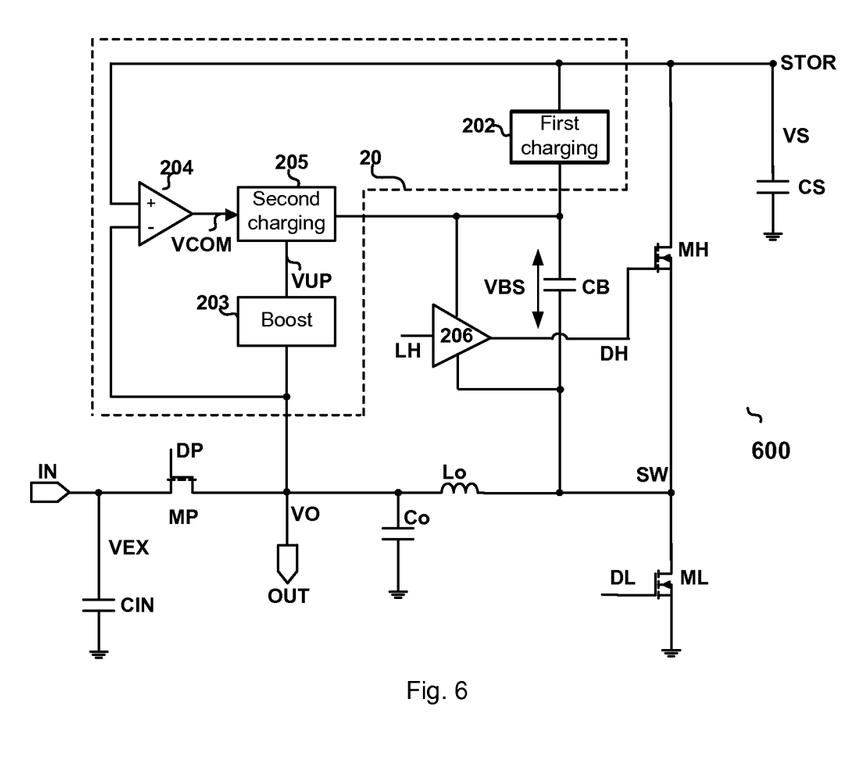
FIG. 6 illustrates a schematic diagram of a power converter 600 in accordance with an exemplary embodiment of the present invention.

FIG. 6 illustrates a schematic diagram of a power converter 600 in accordance with an exemplary embodiment of the present invention. The power converter 600 comprises an input terminal IN, an output terminal OUT, a storage terminal STOR, a switching terminal SW, a ground terminal GND, a channel switch MP, an input capacitor CIN, an output capacitor CO, a storage capacitor CS, a high side switch MH, a low side switch ML, an inductor Lo, a bootstrap capacitor CB and the bootstrap circuit 20.

The input capacitor CIN is coupled between input terminal IN and ground GND, the voltage across the input capacitor CIN is input voltages VEX. The channel switch MP is coupled between the input terminal IN and the output terminal OUT, wherein the output terminal OUT is configured to provide an output voltage VO. The output capacitor Co is couple between the output terminal OUT and ground GND. The inductor Lo is coupled between the output terminal OUT and the switching terminal SW. The high side switch MH is coupled between the switching terminal SW and the storage terminal STOR. The storage capacitor CS is coupled between the storage terminal STOR and ground GND. The low side switch ML is coupled between the switching terminal SW and ground GND. The bootstrap capacitor CB has a first terminal and a second terminal, wherein the second terminal is coupled to the switching terminal SW, configured to provide bootstrap voltage VBS. The bootstrap circuit 20 comprises a first charging circuit 202, a first comparing circuit 204, a boost circuit 203 and a second charging circuit 205. The first charging circuit 202 has an input terminal and an output terminal, wherein the input terminal is configured to receive the storage voltage VS, and wherein the output terminal is coupled to the first terminal of the bootstrap capacitor CB. The boost circuit 203 has an input terminal and an output terminal, wherein the input terminal is configured to receive the storage voltage VS or the output voltage Vo, and wherein the output terminal is configured to provide a first high voltage VUP, for example, 2Vin. The first comparing circuit 204 has a first input terminal, a second input terminal and a first output terminal, the first input terminal is configured to receive the storage voltage VS, the second input terminal is configured to receive the output voltage VO, based on a threshold voltage VTH and a voltage difference VIO between the storage voltage VS and the output voltage Vo, the first comparing circuit is configured to provide a comparing signal VCOM at the first output terminal. The second charging circuit 205 has an input terminal, a control terminal and an output terminal, wherein the input terminal is configured to receive the first high voltage VUP, and wherein the output terminal is coupled to the first terminal of the bootstrap capacitor CB, and wherein the control terminal is configured to receive the comparing signal VCOM, and wherein the second charging circuit 205 is configured to charge the bootstrap capacitor CB in response to the comparing signal VCOM. For example, the second charging circuit 205 charges the bootstrap capacitor CB when the voltage difference between the storage voltage VS and the output voltage VO is smaller than the voltage threshold VTH.

Circuits shown in FIG. 3-5 could also be used in converter 600.

According to an embodiment of present invention, the power converter 600 has a set up mode and a set down mode.

When the power converter 600 works in the set up mode, the pass control signal DP would turn on the channel switch MP, and an external power supply would charge the input capacitor CIN and the output capacitor CO. In an embodiment, during a first half cycle, the high side switch MH is turned off and the low side switch ML is turned on. The output capacitor is discharged via the output inductor Lo, and the current through the inductor is increasing. During a second half cycle, the high side switch MH is turned on and the low side switch ML is turned off, the current through the output capacitor would charge the storage capacitor CS. The storage voltage VS could be greater than the output voltage, so as to store more energy in the output capacitor CO with a designate capacity. In another embodiment, the high side switch could be turned off during a single switching cycle, and the inductor through the inductor Lo could charge the storage capacitor CS via the a parasitic diode of the high side switch MH, which would greatly reduce the difficulty of designing driving circuit for the high side switch MH.

The power converter 600 would work in set down mode when the external power supply is removed, and the storage capacitor CS would charge the output capacitor CO by means of turning the high side switch and the low side switch on and off.

Figure 7:
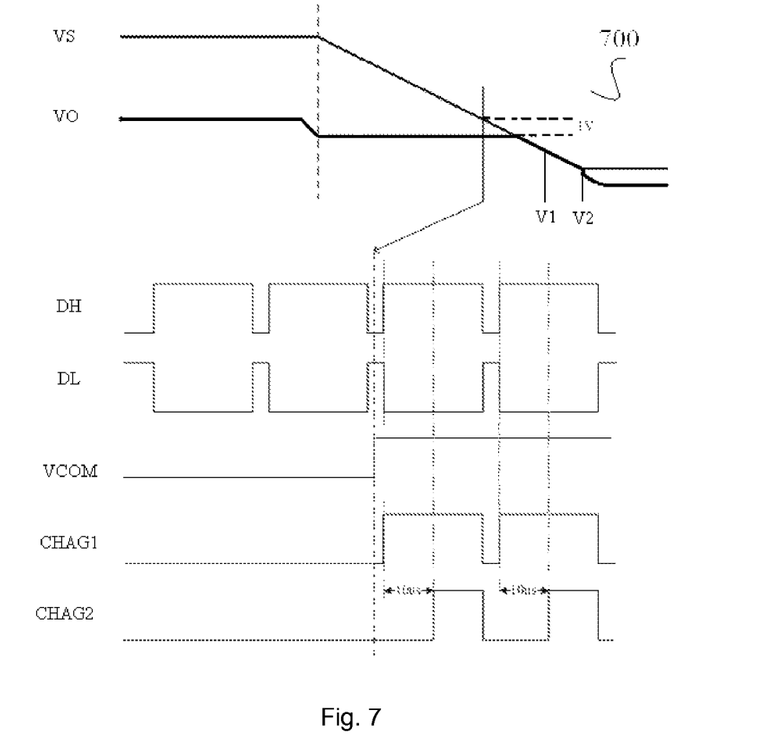
FIG. 7 illustrates an operation waveform 700 of the power converter 600 in set down mode in accordance with an exemplary embodiment of the present invention.

FIG. 7 illustrates an operation waveform 700 of the power converter 600 in set down mode in accordance with an exemplary embodiment of the present invention. The storage voltage VS would keep falling down since energy stored in the storage capacitor CS is continuously being transferred to the output capacitor CO. The comparing signal VCOM would change from a first logic state to a second logic state when the voltage difference between the storage voltage VS and the output voltage Vo is smaller than the threshold voltage VTH. If the comparing signal VCOM is on the first state, the first charging circuit 202 charges the bootstrap capacitor CB when the low side switch is turned on, and the second charging circuit 205 is disabled. If the comparing signal VCOM is on the second state, the second charging circuit 205 charges the bootstrap capacitor CB. In the FIG. 7, both CHAG1 and CHAG2 being on high level indicate that the second charging circuit 205 is charging the bootstrap capacitor CB. The second charging circuit 205 could charge the bootstrap capacitor CB at any time of a switching cycle. In one embodiment, the second charging circuit 205 charges the bootstrap capacitor CB only if the high side switch MH is turned on. As CHAG2 is shown on high level in FIG. 7, the second charging circuit 205 charges the bootstrap capacitor CB 10 us later than the moment that the high side switch MH is turned on, that could prevent the bootstrap capacitor CB from absorbing a large current from the second reference source REG2.

As the input voltage Vin is further reduced, the high side switch MH remains on, the low side switch ML remains off. The power converter 600 works in linear mode. In the linear mode, the first charge circuit 202 will not be able to charge the bootstrap capacitor CB, the second charging circuit 205 continuously charges the bootstrap capacitor CB to avoid the high side switch MH being turned off caused by low VBS. As shown in FIG. 7, in prior art, the high side switch would be turned off when the output voltage decreased to V1. But for the power converter 600, since the second charging circuit charge additional energy to the bootstrap capacitor CB, the high side switch would be turned off when the output voltage decreased to V2.

Figure 8:
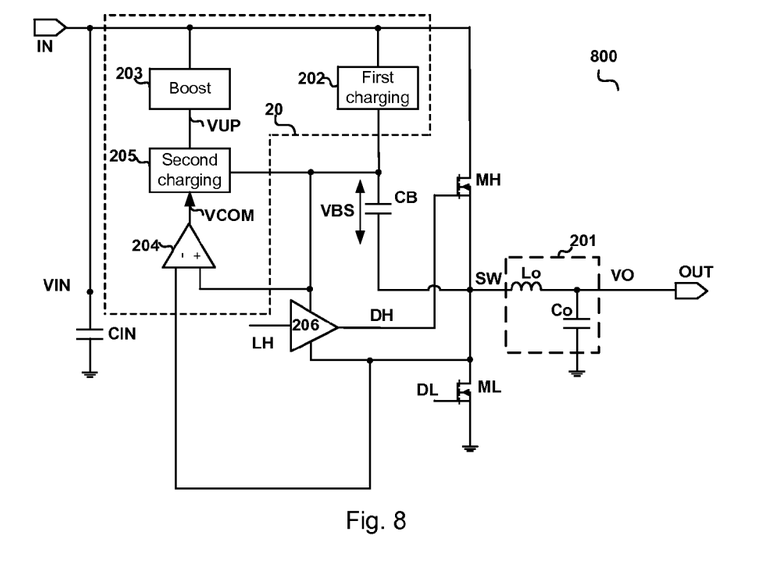
FIG. 8 illustrates a schematic diagram of a power converter 800 in accordance with an exemplary embodiment of the present invention.

FIG. 8 illustrates a schematic diagram of a power converter 800 in accordance with an exemplary embodiment of the present invention. Compared with the power converter 200, the only difference is that the first input terminal of the first comparing circuit 204 is coupled to the first terminal of the bootstrap capacitor CB, and the second input terminal of the first comparing circuit 204 is coupled to the second terminal of the bootstrap capacitor CB. So, the first comparing circuit 204 is configured to provide a comparing signal VCOM based on the first threshold voltage VTH and a voltage difference across the bootstrap capacitor CB (bootstrap voltage). The comparing signal VCOM is on a first logic state when the voltage difference across the bootstrap capacitor CB is smaller than the first threshold voltage VTH, and on a second logic state when the voltage difference across the bootstrap capacitor CB is higher than the first threshold voltage VTH; and wherein if the comparing signal VCOM is on the first logic state, the first charging circuit 202 is configured to charge the bootstrap capacitor CB when the low side switch ML is turned on; and wherein if the comparing signal VCOM is on the second logic state, the second charging circuit 205 is configured to charge the bootstrap capacitor CB when the high side switch MH is turned on.

Power converters with bootstrap circuit described above in the various embodiments of the present invention are illustrative and not intended to be limiting. Well known controlling steps, operating processes, and parameters etc. are not described in detail to avoid obscuring aspects of the invention. Those skilled in the art should understand that the steps described in the embodiments with reference to FIG. 6 may be implemented in different orders and are not limited to the embodiments described.

Although a bootstrap circuit is illustrated and explained based on a buck type power converter according to various embodiments of the present invention, this is not intended to be limiting. Persons of ordinary skill in the art will understand that the circuits, methods and principles taught herein may apply to any other suitable types of power converters, such as boost type power converter, buck-boost type power converter or flyback type power converter etc.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A bootstrap circuit for a power converter, wherein the power converter comprises a high side switch, a low side switch and a bootstrap capacitor for providing a bootstrap voltage to supply a high side driver of the high side switch, and wherein the bootstrap capacitor has a first terminal and a second terminal, and wherein the power converter is configured to receive an input voltage and to provide an output voltage by means of turning the high side switch and the low side switch on and off, the bootstrap circuit comprising:
   a first charging circuit having an input terminal and an output terminal, wherein the input terminal is configured to receive the input voltage, and wherein the output terminal is coupled to the first terminal of the bootstrap capacitor;
   a first comparing circuit having a first input terminal, a second input terminal and an output terminal, wherein the first input terminal is configured to receive the input voltage, and wherein the second input terminal is configured to receive the output voltage, and further wherein based on a first threshold voltage and a voltage difference between the input voltage and the output voltage, the first comparing circuit is configured to provide a comparing signal at the output terminal;
   a boost circuit having an input terminal and an output terminal, wherein the input terminal is configured to receive the input voltage or the output voltage, and wherein the output terminal is configured to provide a first high voltage; and
   a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference between the input voltage and the output voltage is smaller than the voltage threshold.

2. The bootstrap circuit of claim 1, wherein the first charging circuit comprises a first reference source and a first diode, wherein the first reference source is configured to charge the bootstrap capacitor when the low side switch is turned on, and wherein the first diode is configured to prevent the bootstrap capacitor from reversely charging the first reference source when the high side switch is turned on.

3. The bootstrap circuit of claim 1, wherein the boost circuit comprises an integrated 2× charge pump.

4. The bootstrap circuit of claim 1, wherein the first comparing circuit comprises:
   a subtractor having a first input terminal, a second input terminal and an output terminal, wherein the first input terminal is configured to receive the input voltage, the second input terminal is configured to receive the output voltage, and wherein the subtractor is configured to provide a difference signal at the output terminal; and
   a first comparator a first input terminal, a second input terminal and an output terminal, wherein the first input terminal is configured to receive the difference signal, the second input terminal is configured to receive the first threshold voltage, and wherein the subtractor is configured to provide the comparing signal at the output terminal.

5. The bootstrap circuit of claim 1, wherein
   the comparing signal is on a first logic state when the voltage difference between the input voltage and the output voltage is smaller than the first threshold voltage, and on a second logic state when the voltage difference between the input voltage and the output voltage is higher than the first threshold voltage; and wherein
   if the comparing signal is on the first logic state, the first charging circuit is configured to charge the bootstrap capacitor when the low side switch is turned on; and wherein
   if the comparing signal is on the second logic state, the second charging circuit is configured to charge the bootstrap capacitor when the high side switch is turned on.

6. The bootstrap circuit of claim 5, wherein the second charging circuit comprises a second reference source and a second diode, and wherein the second diode is configured to prevent the bootstrap capacitor from charging the second reference source when the comparing signal is on the first logic state, and wherein the second reference source is configured to charge the bootstrap capacitor when the high side switch is turned on and the comparing signal is on the second logic state.

7. The bootstrap circuit of claim 1, wherein the first charging circuit comprises:
   a first transistor having a first terminal, a second terminal and a control terminal, wherein the first terminal of the transistor serves as the first terminal of the first charging circuit;
   a first diode having a cathode and an anode, wherein the anode is coupled to the second terminal of the first transistor, and wherein the cathode serves as the output terminal of the first charging circuit;
   a first resistor having a first terminal and a second terminal, wherein the first terminal is coupled the output terminal of the first charging circuit;
   a second transistor having a first terminal, a second terminal and a control terminal, wherein the first terminal is coupled to the second terminal of the first resistor, and wherein the control terminal is coupled to the second terminal of the bootstrap capacitor;
   a second resistor having a first terminal and a second terminal, wherein the first terminal is coupled the second terminal of the second transistor, and wherein the second terminal is connected to ground; and
   a first amplifier having a first input terminal, a second input terminal and an output terminal, wherein the first input terminal is configured to receive a first reference signal, and wherein the second input terminal is coupled to the first terminal of the second resistor, and wherein the output terminal is coupled to the control terminal of the first transistor.

8. The bootstrap circuit of claim 7, wherein the second charging circuit comprises:
   a third transistor having a first terminal, a second terminal and a control terminal, wherein the first terminal serves as the first terminal of the second charging circuit;
   a second diode having a cathode and an anode, wherein the anode is coupled to the second terminal of the third transistor, and wherein the cathode serves as the output terminal of the second charging circuit;

a first logic circuit, wherein the first logic circuit is configured to provide a control signal according to the comparing signal;

a second amplifier having a first input terminal, a second input terminal and an output terminal, wherein the first input terminal is configured to receive a second reference signal, and wherein the output terminal is coupled to the control terminal of the third transistor; and a first switch having a first terminal, a second terminal, a third terminal and a control terminal, wherein the first terminal is coupled to the first terminal of the second resistor, and wherein the second terminal is coupled to ground, and wherein the third terminal is coupled to the second terminal of the second amplifier, and wherein the control terminal is configured to receive the control signal, and wherein based on a logic state of the control signal, the third terminal is selectively connected to either the first terminal or the second terminal.

9. The bootstrap circuit of claim 8, wherein the first logic circuit provides the control signal based on the comparing signal and a driving signal, and wherein the driving signal is configured to drive the high side switch.

10. A power converter, comprising:

a channel switch coupled between an input terminal of the power converter and an output terminal of the power converter, wherein the output terminal of the power converter is configured to provide a output voltage;

an output capacitor couple between the output terminal of the power converter and ground;

an inductor coupled between the output terminal of the power converter and a switching terminal;

a high side switch coupled between the switching terminal and a storage terminal, wherein the storage terminal of the power converter is configured to provide a storage voltage;

a storage capacitor coupled between the storage terminal and ground;

a low side switch coupled between the switching terminal and ground;

a bootstrap capacitor having a first terminal and a second terminal, wherein the second terminal is coupled to the switching terminal, configured to provide a bootstrap voltage;

a first charging circuit having an input terminal and an output terminal, wherein the input terminal is configured to receive the storage voltage, and wherein the output terminal is coupled to the first terminal of the bootstrap capacitor;

a first comparing circuit having a first input terminal, a second input terminal and a first output terminal, wherein the first input terminal is configured to receive the storage voltage, and wherein the second input terminal is configured to receive the output voltage, and further wherein based on a first threshold voltage and a voltage difference between the storage voltage and the output voltage, the first comparing circuit is configured to provide a comparing signal at the first output terminal;

a boost circuit having an input terminal and an output terminal, wherein the input terminal is configured to receive the storage voltage or the output voltage, and wherein the output terminal is configured to provide a first high voltage; and a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference between the storage voltage and the output voltage is smaller than the voltage threshold.

11. The power converter of claim 10, wherein power converter has a set up mode and a set down mode.

12. The power converter of claim 11, wherein in the set up mode, the channel switch is turned on, power converter charging the storage capacitor by means of turning the low side switch on and off; and wherein in the set down mode, the power converter charges the output capacitor by means of turning the high side switch and the low side switch on and off.

13. The power converter of claim 12, wherein the high side switch is turned off when the power converter is in the set up mode, and wherein the power converter charges the storage capacitor via a parasitic diode of the high side switch.

14. The power converter of claim 11, wherein power converter further has a linear mode, and wherein the high side switch is turned on and the low side switch is turned off in the linear mode.

15. The bootstrap circuit of claim 10, wherein the comparing signal is on a first logic state when the voltage difference between the storage voltage and the output voltage is smaller than the first threshold voltage, and on a second logic state when the voltage difference between the storage voltage and the output voltage is higher than the first threshold voltage; and wherein if the comparing signal is on the first logic state, the first charging circuit is configured to charge the bootstrap capacitor when the low side switch is turned on; and wherein if the comparing signal is on the second logic state, the second charging circuit is configured to charge the bootstrap capacitor when the high side switch is turned on.

16. The bootstrap circuit of claim 15, wherein the second charging circuit comprises a second reference source and a second diode, and wherein the second diode is configured to prevent the bootstrap capacitor from charging the second reference source when the comparing signal is on the first logic state, and wherein the second reference source is configured to charge the bootstrap capacitor when the high side switch is turned on and the comparing signal is on the second logic state.

17. The bootstrap circuit of claim 10, wherein the first charging circuit comprises:

a first transistor having a first terminal, a second terminal and a control terminal, wherein the first terminal of the transistor serves as the first terminal of the first charging circuit;

a first diode having a cathode and an anode, wherein the anode is coupled to the second terminal of the first transistor, and wherein the cathode serves as the output terminal of the first charging circuit;

a first resistor having a first terminal and a second terminal, wherein the first terminal is coupled the output terminal of the first charging circuit;

a second transistor having a first terminal, a second terminal and a control terminal, wherein the first terminal is coupled to the second terminal of the first resistor, and wherein the control terminal is coupled to the second terminal of the bootstrap capacitor;

a second resistor having a first terminal and a second terminal, wherein the first terminal is coupled the second terminal of the second transistor, and wherein the second terminal is connected to ground; and a first amplifier having a first input terminal, a second input terminal and an output terminal, wherein the first input terminal is configured to receive a first reference signal, and wherein the second input terminal is coupled to the first terminal of the second resistor, and wherein the output terminal is coupled to the control terminal of the first transistor.

18. The bootstrap circuit of claim 17, wherein the second charging circuit comprises:

a third transistor having a first terminal, a second terminal and a control terminal, wherein the first terminal serves as the first terminal of the second charging circuit;

a second diode having a cathode and an anode, wherein the anode is coupled to the second terminal of the third transistor, and wherein the cathode serves as the output terminal of the second charging circuit;

a first logic circuit, wherein the first logic circuit is configured to provide a control signal according to the comparing signal;

a second amplifier having a first input terminal, a second input terminal and an output terminal, wherein the first input terminal is configured to receive a second reference signal, and wherein the output terminal is coupled to the control terminal of the third transistor; and a first switch having a first terminal, a second terminal, a third terminal and a control terminal, wherein the first terminal is coupled to the first terminal of the second resistor, and wherein the second terminal is coupled to ground, and wherein the third terminal is coupled to the second terminal of the second amplifier, and wherein the control terminal is configured to receive the control signal, and wherein based on a logic state of the control signal, the third terminal is selectively connected to either the first terminal or the second terminal.

19. A bootstrap circuit for a power converter, wherein the power converter comprises a high side switch, a low side switch and a bootstrap capacitor for providing a bootstrap voltage to supply a high side driver of the high side switch, and wherein the bootstrap capacitor has a first terminal and a second terminal, and wherein the power converter is configured to receive an input voltage and to provide an output voltage by means of turning the high side switch and the low side switch on and off, the bootstrap circuit comprising:

a first charging circuit having an input terminal and an output terminal, wherein the input terminal is configured to receive the input voltage, and wherein the output terminal is coupled to the first terminal of the bootstrap capacitor;

a first comparing circuit having a first input terminal, a second input terminal and an output terminal, wherein the first input terminal is coupled to the first terminal of the bootstrap capacitor, and wherein the second input terminal is coupled to the second terminal of the bootstrap capacitor, and further wherein based on a first threshold voltage and a voltage difference across the bootstrap capacitor, the first comparing circuit is configured to provide a comparing signal at the output terminal;

a boost circuit having an input terminal and an output terminal, wherein the input terminal is configured to receive the input voltage or the output voltage, and wherein the output terminal is configured to provide a first high voltage; and a second charging circuit having an input terminal, a control terminal and an output terminal, wherein the input terminal is configured to receive the first high voltage, and wherein the output terminal is coupled to the first terminal of the bootstrap capacitor, and wherein the control terminal is configured to receive the comparing signal, and wherein the second charging circuit is configured to charge the bootstrap capacitor when the voltage difference across the bootstrap capacitor is smaller than the voltage threshold.

20. The bootstrap circuit of claim 19, wherein the comparing signal is on a first logic state when the voltage difference across the bootstrap capacitor is smaller than the first threshold voltage, and on a second logic state when the voltage difference across the bootstrap capacitor is higher than the first threshold voltage; and wherein if the comparing signal is on the first logic state, the first charging circuit is configured to charge the bootstrap capacitor when the low side switch is turned on; and wherein if the comparing signal is on the second logic state, the second charging circuit is configured to charge the bootstrap capacitor when the high side switch is turned on.

* * * * *